United States Patent
Witte

(10) Patent No.: US 12,466,227 B2
(45) Date of Patent: Nov. 11, 2025

(54) MOTOR VEHICLE HAVING A CHASSIS WITH AN AIR SPRING SYSTEM

(71) Applicant: Dr. Ing. h.c. F. Porsche Aktiengesellschaft, Stuttgart (DE)

(72) Inventor: Thomas Witte, Ditzingen-Heimerdingen (DE)

(73) Assignee: Dr. Ing. h.c. F. Porsche Aktiengeseiischaft (DE)

( * ) Notice: Subject to any disclaimer, the term of this patent is extended or adjusted under 35 U.S.C. 154(b) by 0 days.

(21) Appl. No.: 18/762,749

(22) Filed: Jul. 3, 2024

(65) Prior Publication Data

US 2025/0010678 A1 Jan. 9, 2025

(30) Foreign Application Priority Data

Jul. 4, 2023 (DE) ...................... 10 2023 117 575.0

(51) Int. Cl.
*B60G 11/27* (2006.01)
*B60L 1/00* (2006.01)
*B60L 50/60* (2019.01)

(52) U.S. Cl.
CPC .............. *B60G 11/27* (2013.01); *B60L 1/003* (2013.01); *B60L 50/60* (2019.02); *B60G 2202/152* (2013.01); *B60G 2202/416* (2013.01); *B60G 2300/50* (2013.01)

(58) Field of Classification Search
None
See application file for complete search history.

(56) References Cited

U.S. PATENT DOCUMENTS

2024/0317012 A1* 9/2024 Lenniger ................. B60L 50/60

FOREIGN PATENT DOCUMENTS

| CN | 114619822 B | * | 11/2023 | ........... B01D 53/261 |
| DE | 102013003512 A1 | * | 9/2014 | ............. F04B 49/06 |
| DE | 102014009986 A1 | * | 1/2015 | ............. B60G 11/58 |
| DE | 102021121399 A1 |   | 6/2022 |  |
| DE | 102024200098 B3 | * | 10/2024 |  |

OTHER PUBLICATIONS

Translation of DE102013003512A1 (Year: 2014).*

* cited by examiner

*Primary Examiner* — Faye M Fleming
(74) *Attorney, Agent, or Firm* — Buchanan Ingersoll & Rooney PC

(57) ABSTRACT

A motor vehicle having a chassis including an air spring system. The motor vehicle includes a high-voltage on-board electrical system and a high-voltage battery supplying electrical energy to the high-voltage on-board electrical system. The air spring system includes at least one air spring which is supplied with air at a respective required pressure via a pneumatic line connected to an air spring compressor. The air spring compressor is a high-voltage air spring compressor which is supplied with electrical energy via the high-voltage on-board electrical system of the motor vehicle. The air spring is supplied with air exclusively and directly via the high-voltage air spring compressor during operation of the motor vehicle.

7 Claims, 1 Drawing Sheet

MOTOR VEHICLE HAVING A CHASSIS WITH AN AIR SPRING SYSTEM

CROSS-REFERENCE TO RELATED APPLICATION

This application claims priority to German Patent Application No. 10 2023 117 575.0, filed Jul. 4, 2023, the content of such application being incorporated by reference herein in its entirety.

FIELD OF THE INVENTION

The present invention relates to a motor vehicle having a chassis, wherein the chassis comprises an air spring system.

BACKGROUND OF THE INVENTION

In addition to trucks, air suspensions for chassis are also found in passenger cars with upscale fittings, wherein they are valued for their particularly fine response and the possibility of height adjustment, among other things. In air spring systems for vehicles, an air spring is typically arranged at each end of each axis, which is pressurized with compressed air at the required pressure by means of an air spring compressor. Often, only a single air spring compressor is used, wherein the individual control of the individual air springs is enabled via corresponding valves. In classic combustion vehicles, the corresponding air spring compressor is supplied with electrical energy via the motor vehicle's low-voltage on-board electrical system, which is typically configured as a 12 volt on-board electrical system. Accordingly, the performance of the air spring compressor is limited. This makes it necessary to provide a compressed air reservoir in order to reduce the adjustment times and improve the availability, in particular the rapid availability, of compressed air. The disadvantage of such a compressed air reservoir is that it must generally have a volume of at least 5 to 10 liters, so that the compressed air reservoir occupies a correspondingly large installation space. Furthermore, the compressed air reservoir adds a significant additional weight to the motor vehicle, as the compressed air reservoir must be configured to be of a correspondingly massive design for storing the compressed air.

Modern motor vehicles are often configured as electrically or at least partially electrically driven motor vehicles. Such vehicles are, for example, battery electric vehicles (BEV) as well as semi-electric motor vehicles, so-called hybrid vehicles (HEV), which also include plug-in hybrid vehicles (PHEV). Such motor vehicles have a high-voltage on-board electrical system that is supplied with electrical energy via a high-voltage battery of the motor vehicle.

SUMMARY OF THE INVENTION

Described herein is an electric or partially electric motor vehicle with respect to an air spring system provided in the motor vehicle.

The motor vehicle comprises a high-voltage on-board electrical system, wherein this high-voltage on-board electrical system is supplied with electrical energy via a high-voltage battery. For example, the high-voltage battery may be a lithium ion battery formed from a plurality of battery modules and/or a plurality of battery cells interconnected with each other. Preferably, the high-voltage on-board electrical system is operated at an operating voltage of greater than or equal to 60 volts. The motor vehicle comprises a chassis, wherein the chassis comprises an air spring system, wherein the air spring system comprises at least one air spring, which is supplied with air at a required pressure via a pneumatic line connected to the air spring compressor. It is provided that the air spring compressor is configured as a high-voltage air spring compressor that is supplied with electrical energy via the high-voltage on-board electrical system of the motor vehicle, wherein the air spring is supplied with air exclusively and directly via the high-voltage air compressor.

By increasing the performance of the air spring compressor accordingly, which is possible because the air spring compressor is configured as a high-voltage air spring compressor and is supplied with electrical energy via the high-voltage on-board electrical system, and is thus significantly more powerful than an air spring compressor supplied with electrical energy via a 12 volt on-board electrical system, the respective air spring can be supplied with air exclusively and directly via the high-voltage air spring compressor, without the response behavior of the air spring system being excessively impaired when the pressurization of the air spring is adjusted, for example for the purpose of level adjustment. This opens up the possibility of supplying the air spring with air exclusively and directly via the high-voltage air spring compressor. In particular, an additional compressed air reservoir can be dispensed with or the compressed air reservoir may be selected smaller because the performance of a high-voltage air spring compressor can significantly exceed the performance of a 12 volt compressed air compressor. With a high-voltage air spring compressor, acceptable adjustment times can therefore be achieved without providing a compressed air reservoir. Accordingly, it is considered particularly advantageous if a pneumatic circuit of the air spring system is free of a compressed air reservoir, resulting in a significant gain in installation space and simplification of the pneumatic circuit. The design of the air spring compressor as a high-voltage air spring compressor also reduces the load on the 12 volt on-board electrical system.

In a particularly preferred embodiment, it is provided that the motor vehicle is a passenger car, in particular a sports car. Weight and installation space savings are particularly advantageous and desirable for sports cars.

In a preferred embodiment, the motor vehicle is configured as a purely battery electric vehicle or a hybrid vehicle, in particular a plug-in hybrid vehicle.

In a particularly preferred embodiment, it is provided that the high-voltage air spring compressor is cooled via a cooling circuit. By cooling the high-voltage air spring compressor, a particularly high-performance high-voltage air spring compressor can be used, thereby increasing the efficiency, response behavior and also the availability of the air spring compressor, and thus the adjustment of the air spring chassis can be carried out particularly quickly without the need for an air reservoir.

It is considered to be particularly advantageous if the motor vehicle comprises one or more electric drives for driving the motor vehicle, wherein the motor vehicle comprises a drive cooling circuit for cooling the one or more electric drives, wherein the high-voltage air spring compressor is thermally coupled to the drive cooling circuit for cooling the high-voltage air spring compressor. This design is particularly advantageous in that the drive cooling circuit is also used to cool the high-voltage air spring compressor, thereby eliminating the need for a separate cooling circuit and/or separate cooling assembly for the high-voltage air spring compressor.

Preferably, the high-voltage air spring compressor comprises a compressor, in particular a rotary compressor.

Preferably, the high-voltage air spring compressor includes a controller for controlling a rotational speed of the high-voltage air spring compressor.

In a preferred embodiment, it is provided that the high-voltage air spring compressor has an electric drive motor which in particular has an output of greater than or equal to 1 kW.

Preferably, the electric drive motor can be operated in a recuperation operation for energy recuperation when discharging air from the air spring, for example for the purpose of lowering/draining the motor vehicle.

It is considered advantageous when dehumidification components are provided.

The high-voltage air spring compressor may well have an integrated compressed air reservoir.

It is considered particularly advantageous when the high-voltage air spring compressor forms a modular component of an electric drive of the motor vehicle. It is quite conceivable that the high-voltage air spring compressor is mechanically and electrically connected to the electric drive, thereby eliminating the need for separate wiring of the high-voltage air spring compressor to the high-voltage on-board electrical system of the motor vehicle. This simplifies assembly. In addition, the installation of any high-voltage air spring compressor to be provided can be carried out in a production line in a particularly straightforward manner during the installation of the electric drive.

It is considered particularly advantageous when the motor vehicle comprises a plurality of high-voltage air spring compressors. In particular, it is conceivable that a high-voltage air spring compressor is provided on each of the electric drives.

BRIEF DESCRIPTION OF THE DRAWINGS

In the following FIGs., the invention is explained in further detail with reference to an embodiment example, without being limited thereto. The FIGs. show.

DETAILED DESCRIPTION OF THE INVENTION

Figure 1:
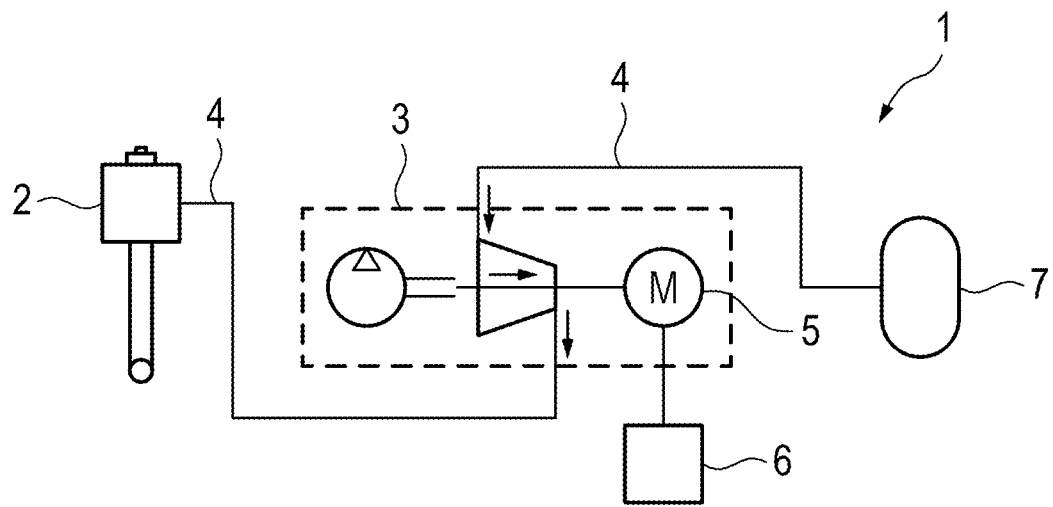
FIG. 1 an air spring system as is known from the prior art in a schematic representation, FIG. 2 an air spring system according to aspects of the invention in a schematic diagram.

FIG. 1 shows an air spring system 1 known from the prior art for a chassis of a motor vehicle, wherein the air spring system 1 comprises at least one air spring 2, which is supplied with air at a required pressure via a pneumatic line 4 connected to an air spring compressor. The air spring compressor is configured as a low-voltage air spring compressor 3. Accordingly, an electric drive motor of the low-voltage air spring compressor 3 is configured as a low-voltage drive motor 5 and is connected to a low-voltage on-board electrical system 6, in the present case a 12 volt on-board electrical system, and is supplied with electrical energy via this. As the low-voltage air spring compressor 3 has relatively low power output, adjusting the air spring 2 using only the low-voltage air-spring compressor 3 would be relatively slow. A compressed air reservoir 7 is therefore provided in order to reduce the adjustment times and improve the availability, in particular the rapid availability, of compressed air.

Figure 2:
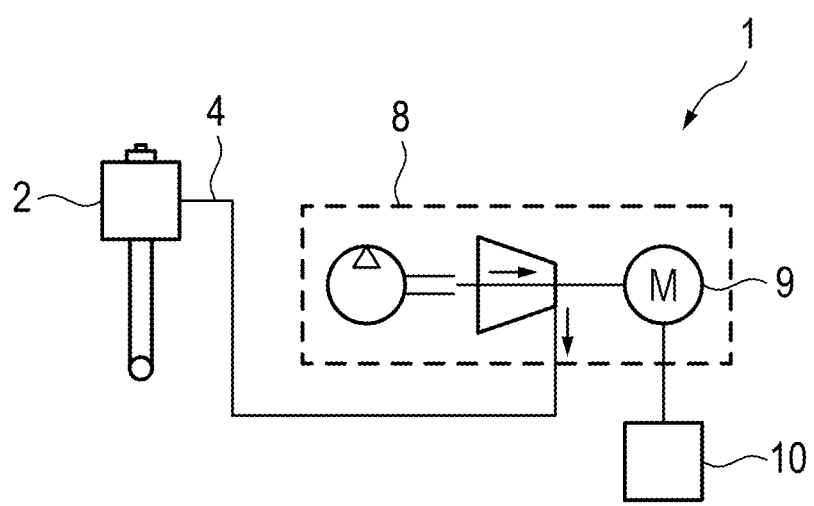

In contrast to the prior art shown in FIG. 1, FIG. 2 provides for the air spring compressor to be configured as a high-voltage air spring compressor 8. Accordingly, an electric drive motor of the high-voltage air spring compressor 8 is configured as a high-voltage drive motor 9 and is connected to a high-voltage on-board electrical system 10, which is operated at an operating voltage of greater than or equal to 60 volts, and is supplied with electrical 10 energy via this. The performance of the high-voltage drive motor 9 is significantly higher than the performance of the low-voltage drive motor 5. Therefore, when using the high-voltage air spring compressor 8, the air spring 2 can be supplied with air exclusively and directly via the high-voltage air spring compressor 8 without the response behavior of the air spring system 1 being excessively impaired when the pressurization of the air spring 2 is adjusted, for example for the purpose of level adjustment. This opens up the possibility of supplying the air spring 2 with air exclusively and directly via the high-voltage air spring compressor 8. The additional compressed air reservoir 7 can in particular be dispensed with, as is also the case with the solution according to aspects of the invention shown in FIG. 2.

What is claimed is:

1. A motor vehicle comprising:
   an on-board high-voltage electrical system;
   a high-voltage battery that is configured to supply the high-voltage on-board electrical system with electrical energy; and
   a chassis comprising an air spring system,
   wherein the air spring system comprises at least one air spring which is configured to be supplied with air at a respective required pressure via a pneumatic line connected to an air spring compressor,
   wherein the air spring compressor is a high-voltage air spring compressor which is configured to be supplied with electrical energy via the on-board high-voltage electrical system of the motor vehicle,
   wherein the air spring is configured to be supplied with air exclusively and directly via the high-voltage air spring compressor during operation of the motor vehicle,
   wherein a pneumatic circuit of the air spring system is free of a compressed air reservoir.

2. The motor vehicle according to claim 1, wherein the motor vehicle is a passenger vehicle.

3. The motor vehicle according to claim 1, wherein the motor vehicle is a battery electric vehicle or a semi-electric vehicle.

4. A motor vehicle comprising:
   an on-board high-voltage electrical system;
   a high-voltage battery that is configured to supply the high-voltage on-board electrical system with electrical energy; and
   a chassis comprising an air spring system,
   wherein the air spring system comprises at least one air spring which is configured to be supplied with air at a respective required pressure via a pneumatic line connected to an air spring compressor,
   wherein the air spring compressor is a high-voltage air spring compressor which is configured to be supplied with electrical energy via the on-board high-voltage electrical system of the motor vehicle,
   wherein the air spring is configured to be supplied with air exclusively and directly via the high-voltage air spring compressor during operation of the motor vehicle,
   wherein the high-voltage air spring compressor is cooled via a cooling circuit.

5. The motor vehicle of claim 4, wherein the motor vehicle comprises one or more electric drives for driving the motor vehicle, wherein the motor vehicle comprises a drive cooling circuit for cooling the one or more electric drives, wherein the high-voltage air spring compressor is thermally coupled to the drive cooling circuit for cooling the high-voltage air spring compressor.

6. The motor vehicle according to claim 1, wherein the high-voltage air spring compressor forms a modular component of an electric drive of the motor vehicle.

7. A motor vehicle comprising:
  an on-board high-voltage electrical system;
  a high-voltage battery that is configured to supply the high-voltage on-board electrical system with electrical energy; and
  a chassis comprising an air spring system,
  wherein the air spring system comprises a plurality of air springs, each of which is configured to be supplied with air at a respective required pressure via a respective pneumatic line connected to a respective air spring compressor of a plurality of high-voltage air spring compressors,
  wherein each air spring compressor of the plurality of high voltage air spring compressors is a high-voltage air spring compressor which is configured to be supplied with electrical energy via the on-board high voltage electrical system of the motor vehicle,
  wherein each air spring is configured to be supplied with air exclusively and directly via the respective high-voltage air spring compressor during operation of the motor vehicle.

* * * * *